US006449532B1

(12) United States Patent
Nicol

(10) Patent No.: US 6,449,532 B1
(45) Date of Patent: Sep. 10, 2002

(54) PROGRAMMABLE BEVERAGE DISPENSING APPARATUS

(76) Inventor: Gorham Nicol, 19799 SW. 95$^{th}$ Pl., Tualatin, OR (US) 97062

(*) Notice: Subject to any disclaimer, the term of this patent is extended or adjusted under 35 U.S.C. 154(b) by 0 days.

(21) Appl. No.: 09/989,925

(22) Filed: Nov. 20, 2001

Related U.S. Application Data

(60) Provisional application No. 60/252,940, filed on Nov. 22, 2000.

(51) Int. Cl.$^7$ .................................................. G06F 17/00

(52) U.S. Cl. ........................... 700/233; 700/28; 222/52; 222/639; 222/640

(58) Field of Search ................................ 700/231, 232, 700/233, 239, 240, 282, 265, 28, 29, 46, 47; 141/192, 196; 137/3; 222/52, 639, 640, 641, 129.3, 129.4

(56) References Cited

U.S. PATENT DOCUMENTS

| | | | | |
|---|---|---|---|---|
| 4,276,999 A | | 7/1981 | Reichenberger | |
| 4,821,925 A | * | 4/1989 | Wiley et al. | 222/129.4 |
| 4,827,426 A | * | 5/1989 | Patton et al. | 364/479 |
| 4,979,639 A | * | 12/1990 | Hoover et al. | 222/1 |
| 4,979,641 A | * | 12/1990 | Turner | 222/25 |
| 5,027,284 A | * | 6/1991 | Senghaas et al. | 364/479 |
| 5,046,569 A | | 9/1991 | von der Haar et al. | |
| 5,102,011 A | * | 4/1992 | Whigham et al. | 222/1 |
| 5,148,943 A | | 9/1992 | Moller | |
| 5,357,306 A | | 10/1994 | Skye et al. | |
| 5,454,406 A | * | 10/1995 | Rejret et al. | 141/1 |
| 5,492,250 A | | 2/1996 | Sardynski | |
| 5,695,092 A | | 12/1997 | Schrandt | |
| 5,731,981 A | | 3/1998 | Simard | |
| 5,787,943 A | | 8/1998 | Schroeder | |
| 5,816,448 A | | 10/1998 | Kobold | |
| 5,839,483 A | * | 11/1998 | Rejret et al. | 141/1 |
| 5,967,367 A | * | 10/1999 | Orsborn | 222/30 |
| 5,974,345 A | | 10/1999 | Buck et al. | |
| 5,988,859 A | | 11/1999 | Kirk | |
| 6,097,993 A | | 8/2000 | Skupin et al. | |

* cited by examiner

*Primary Examiner*—Christopher P. Ellis
*Assistant Examiner*—Khoi H. Tran
(74) *Attorney, Agent, or Firm*—Marger Johnson & McCollom, P.C.

(57) ABSTRACT

A dispensing apparatus having a plurality of programmable buttons adapted to activate a sequence that dispenses a desired amount of product. A circuit board is coupled between dispense activation buttons, a programming button and a valve manifold and includes a timer, accumulator, memory and controller together to operate solenoid valves. In learn mode, the cumulative time that a particular button is depressed is programmed into a memory circuit and associated with that button. In dispense mode, depressing that dispense activation button causes power to be supplied to a solenoid, thereby directing pressurized air to a particular pump responsible for pumping a particular type of product from a source to the dispensing head. Power is supplied to the solenoid for a time period stored in memory during the programming steps. In this way, the dispensing apparatus can be easily programmed to dispense a desired amount of product having various viscosities.

17 Claims, 4 Drawing Sheets

PROGRAMMABLE BEVERAGE DISPENSING APPARATUS

This application claims the benefit of U.S. provisional application No. 60/252,940, filed Nov. 22, 2000.

BACKGROUND OF THE INVENTION

This invention relates generally to beverage dispensing apparatus, and more particularly to an apparatus with programmable dispensing buttons for dispensing a programmed amount of product.

Beverage dispensers, such as those used in the restaurant industry, are wellknown in the art. Some such dispensers, such as the one disclosed in U.S. Pat. No. 5,731,981 to Simard, include a keypad at a dispensing end that dispense a metered amount of product at the press of a button. Each of the buttons of the keypad is preprogrammed to activate a sequence whereby a selected type of mixed drink in a desired quantity is dispensed. As with most other dispensing machines of this type, the Simard device uses flow meters to regulate the amount of product dispensed.

One noted drawback to Simard-type systems using flow meters is their inability to accurately dispense desired quantities of products having a variety of different viscosities. It is generally understood that the higher the viscosity of the product dispensed, the higher the pressure the pump must exert to drive the product from the storage container to the dispensing end of the machine and/or the longer the flow valve must be kept open. The viscosity of certain types of products, such as juice concentrate, is further complicated by such environmental factors as ambient temperature, humidity and altitude. Using Simard-type systems to dispense a desired amount of such product with the single press of a button on the dispensing end of the machine would result in an inaccurate dispensed amount.

Programming of dispenser buttons is also known in the art. For example, U.S. Pat. No. 5,492,250 to Sardynski discloses a beverage dispenser having control buttons. A user programs the buttons in a learning mode by filling a container to a specific level; a button is then programmed to dispense that level of fluid. However, the “learning mode” in conventional dispensers is somewhat rudimentary, in that a user must dispense a chosen amount of product in one aliquot. Such coarse button calibration is undesirable where a concentrated product is intended to be mixed with another fluid, e.g., fruit juice concentrate and water.

Accordingly, the need remains for a system that allows greater programmability of the amount of product dispensed, as well as flexibility according to the flow characteristics of the various products.

SUMMARY OF THE INVENTION

An important element of the new dispenser design is the programmability of the dispenser buttons. When a switch on the dispenser head is activated, the device is placed in learning mode. Pressing one of the dispenser buttons starts a timer on the circuit board. Concurrently, a signal is sent from the controller portion of the circuit board to a designated solenoid valve on a valve manifold assembly mounted within the dispenser casing. The signal retracts the solenoid and compressed air travels through the valve to a pump for as long as the button is depressed and the signal activated, thus driving one of the liquids to the dispenser head.

A user can press and release the button several times until a desired amount of liquid is dispensed. An accumulator on the circuit board totals up the amount of time the button is depressed and programs that accumulated time amount into a memory subsystem on the circuit board. When the button is depressed again and the machine is in normal (non-learning) mode, the solenoid signal is active for the amount of time stored in memory for that particular button. In this way, the machine can be easily calibrated and adjusted for dispensing a variety of different liquids in a variety of different controllable amounts under a variety of conditions.

Another important element of the operation of the device is the fact that the pumps do not have an automatic shutoff system but are only active for as long as compressed air is delivered to the pump. Tests have shown such an arrangement to limit stalling.

Still another important feature is the use of a check valve immediately adjacent the dispensing head to control drippage.

The foregoing and other objects, features and advantages of the invention will become more readily apparent from the following detailed description of a preferred embodiment of the invention that proceeds with reference to the accompanying drawings.

DETAILED DESCRIPTION

As used herein, “product” refers both to a particular beverage concentrate to be drawn from a product source, and also to a final product dispensed from the apparatus (e.g., a fruit beverage made of beverage concentrate and water).

According to one embodiment, a representative dispensing apparatus comprising the present invention is used to produce blended fruit drinks made from concentrate and ice. The apparatus is typically a self-contained unit and can be countertop mounted. The apparatus can include a molded or formed outer shell of three main parts: an ice bin with pull-out drawer and slide back lid, a lower workspace surface, a concentrate dispensing area to the right of the flange, and a pump cabinet.

Figure 1:
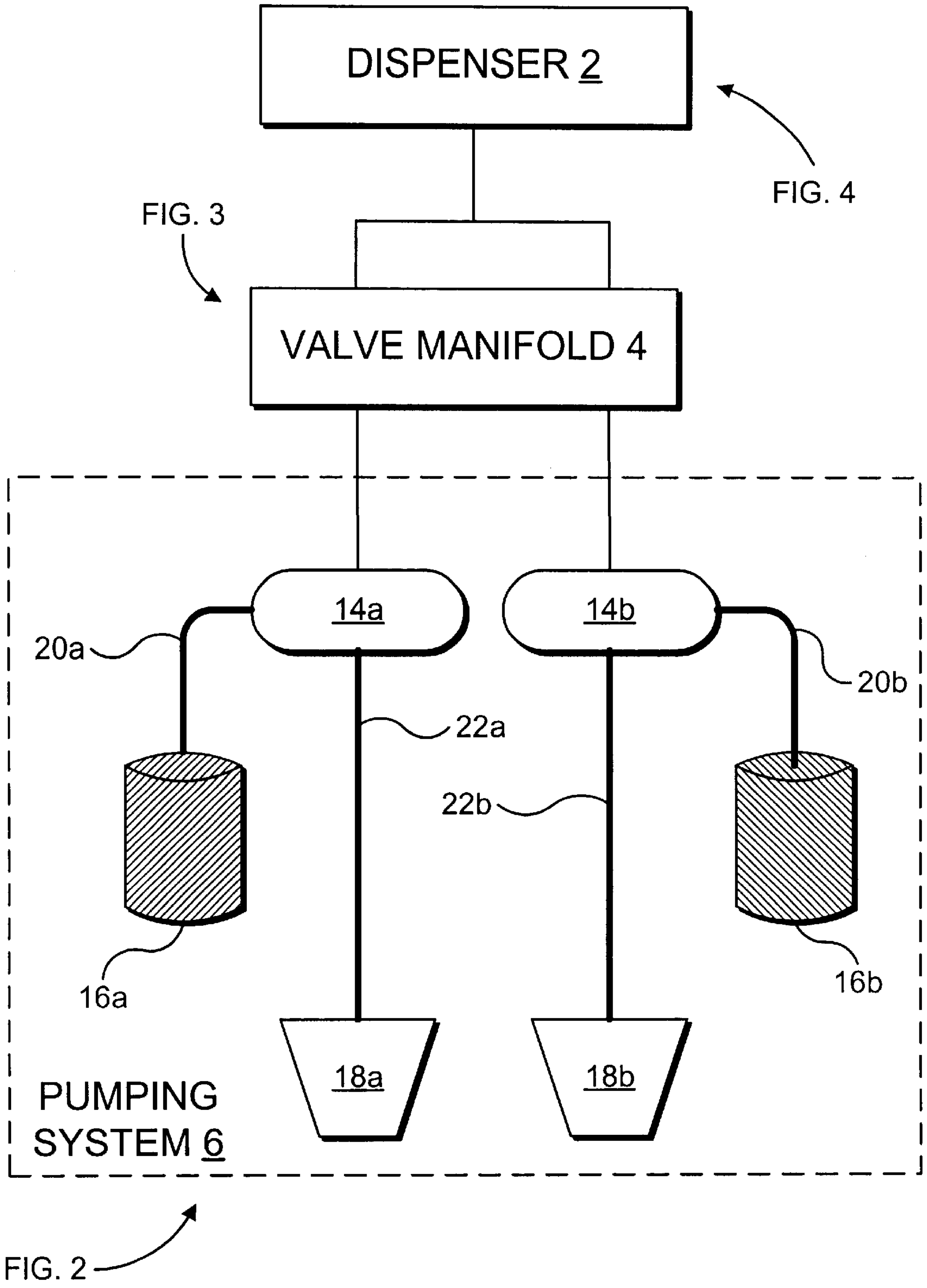
FIG. 1 is a diagram of the components of a dispensing apparatus.

FIG. 1 is a diagram of one embodiment of a beverage dispensing apparatus according to the present disclosure. A beverage dispensing system comprises a dispenser 2 and a pumping system 6. the system can optionally include a valve manifold system 4.

The dispenser 2 comprises an actuator and a dispensing regulator. These components are discussed more fully below.

The pumping system comprises dispensing heads 18*a*, 18*b*; pumps 14*a*, 14*b*; and tubing 20*a*, 20*b*, 22*a*, 22*b*. The pumping components generally include tubing 20*a*, 20*b* coupling a plurality of product sources 16*a*, 16*b* to one or more pumps 14*a*, 14*b*, and tubing 22*a*, 22*b* coupling each pump to a dispensing head 18*a*, 18*b*.

Dispensing heads are known in the art to operate as ports or outlets for the outflow of fluid product. The present apparatus can utilize a plurality of dispensing heads or, altematively, various products can be dispensed from a single dispensing head.

Figure 2:
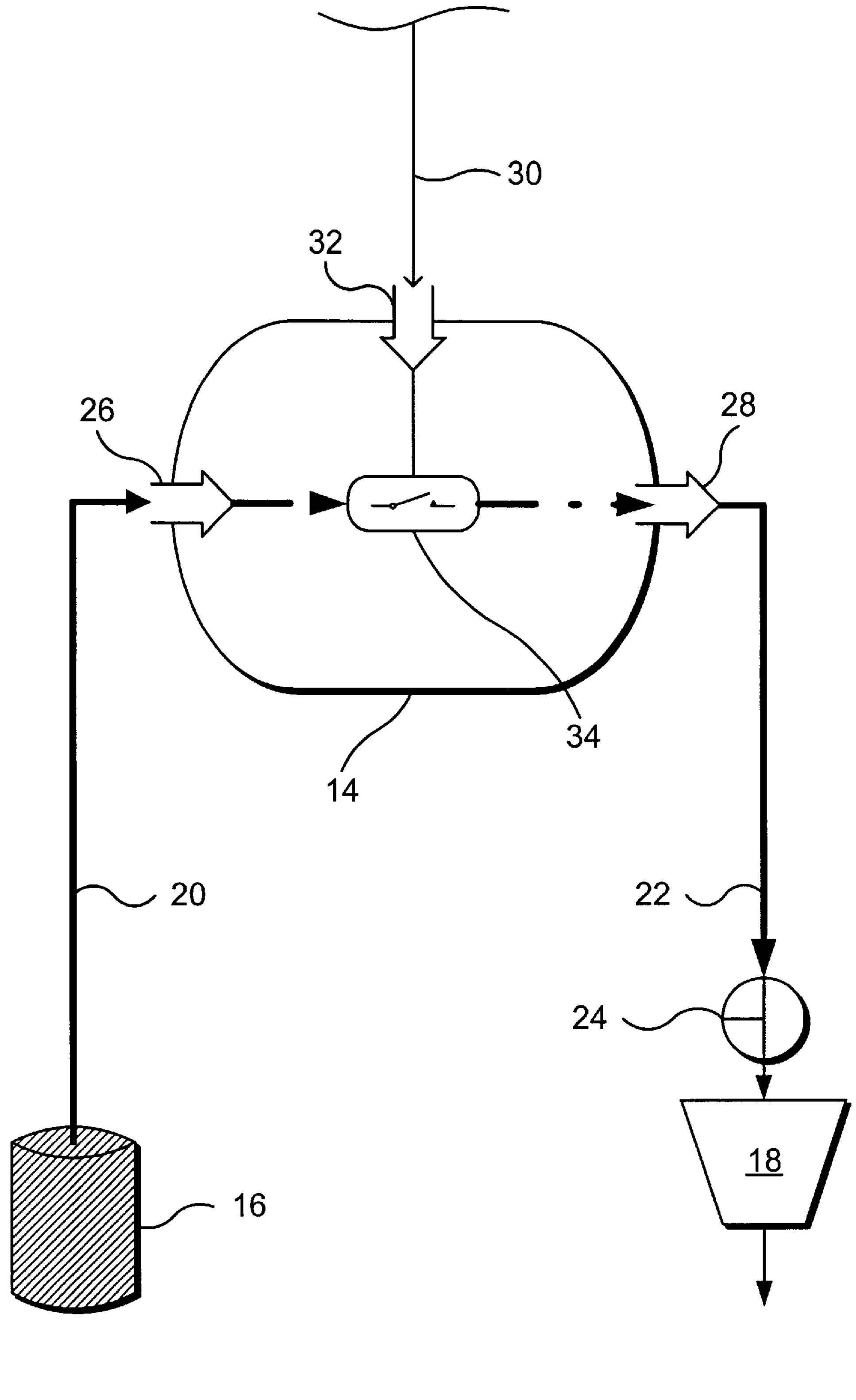
FIG. 2 is a diagram of the pumping system of FIG. 1.

FIG. 2 is a diagram of a scalable subset of the pumping system 6 of FIG. 1. The number of pumps 14 mounted within the cabinet is dictated by the number of products being dispensed. The embodiment illustrated in FIG. 1 is set up to handle two different juice concentrate products and thus includes two different pumping units 14*a*, 14*b*.

Each pump 14 comprises a product intake port 26 and a product dispensing port 28. The product intake port 26 draws product from a product source 16 via product intake tubing 20.

Product intake tubing 20 is provided, adapted to couple a product source 16 to a product intake port 26 of a pump 14. The product dispensing port expels product to a dispensing head via product dispensing tubing. Product dispensing tubing 22 couples a product dispensing port 28 to a dispensing head 18.

According to the present disclosure, a check valve 24 is positioned adjacent the dispensing head. The check valve 24 can alternatively be coupled between the product dispensing tubing 22 (from the pump) and the dispensing head 18, It is preferred, however, that the check valve be placed as close to the dispensing port on the dispenser head as possible.

The check valve is operative to prevent unwanted flow, e.g., drippage. The check valve can be included within the dispenser head to minimize drippage when the flow is cut off. As well, the check valve prevents product within the dispensing head from exposure to air. A reduction in air exposure reduces product spoilage.

A pump is preferably adapted to be activated by pressurized air. The pump adapted to be so activated comprises an air intake port 32. The air intake port receives pressurized air from a pressurized air source via pressurized air tubing 30.

In such embodiment, a pump solenoid (e.g., 40*b* in FIG. 3) is actuated by a user. The pump solenoid is operative to activate a pump 14 in response to said actuation. In this embodiment, a pump solenoid activates a pump by delivering pressurized air to the pump. For example, the pressurized air can operate by closing a switch 34 and thereby causing activation of the pump, although alternative mechanisms of activation via pressurized air can be readily envisioned.

When the pump 14 is activated, product is driven from the intake port 26 to the dispensing port 28. The pumping unit shown operates for as long as pressurized air is supplied to the pump, but an electrically driven pump would also work.

It has been found that a pump works more effectively and is less prone to stalling while pumping viscous products, such as juice concentrate, if the auto-shutoff shutoff feature of the pump is eliminated. This feature typically measures the suction forces effective within the pump and ceases the pumping action when the suction forces deviate beyond a certain range, as when the container from which the product is being pumped runs empty.

As will be explained further below, pressurized air supply tubing and product intake tubing are generally conducted through the back of a pump cabinet. The product reservoir (i.e., container of beverage concentrate) and pressurized air source need not be proximate the dispensing apparatus but can be located in a back room. Product dispensing tubing coupled to the pumps conducts the concentrate to the dispensing head (not shown) for discharge into a container in a desired amount.

Figure 3:
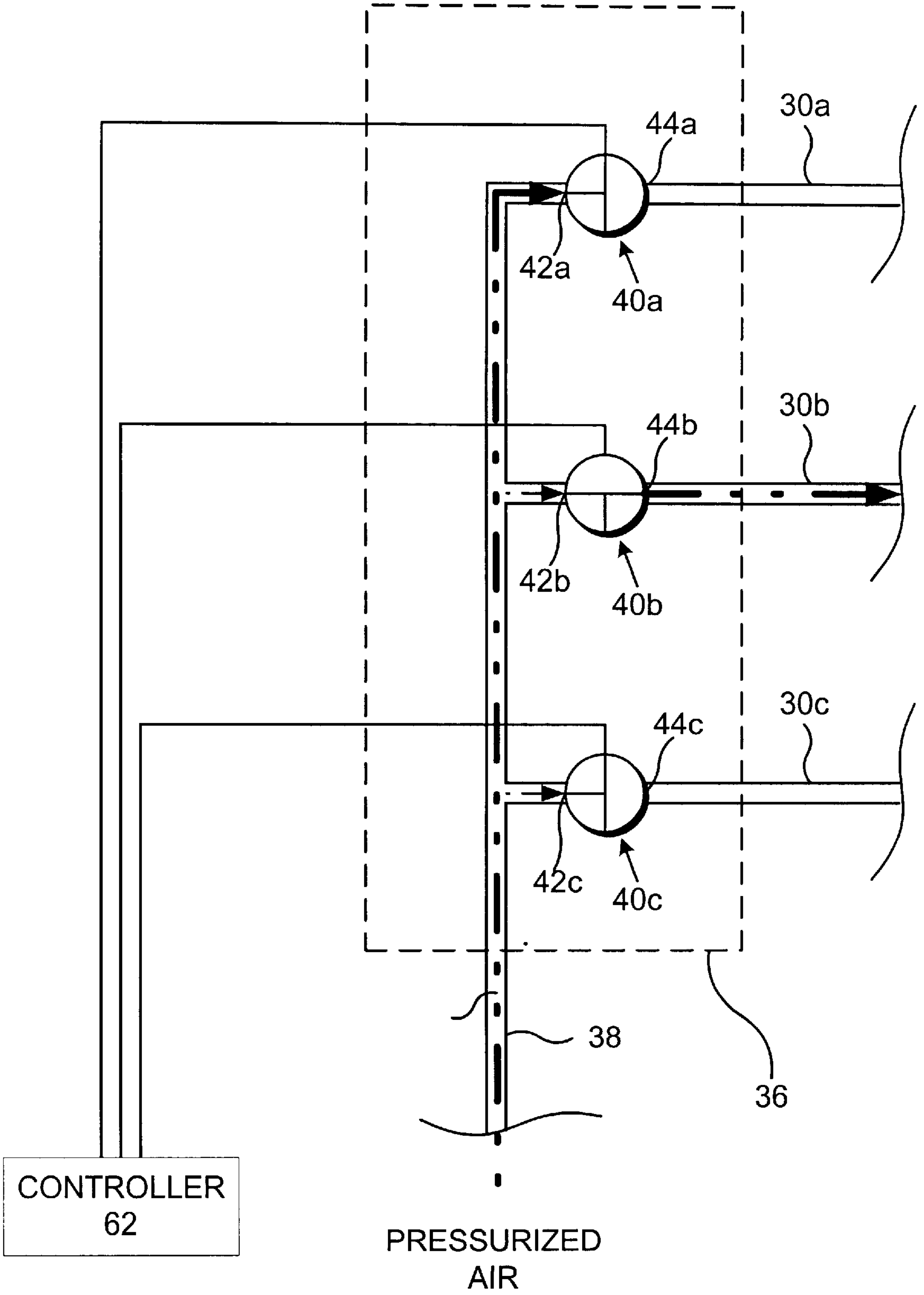
FIG. 3 is a diagram of a valve manifold system in accordance with one embodiment of the present system.

FIG. 3 is a diagram of a valve manifold system 4 according to one embodiment of the apparatus of FIG. 1. The manifold shown in FIG. 3 is constructed for use in an apparatus dispensing three different products.

The valve manifold includes a series of pump solenoid valves 40*a*–40*c* electrically coupled to a controller. Each solenoid valve has a pressurized air intake aperture 42*a*–42*c* and a pressurized air exhaust aperture 44*a*–44*c*. The pressurized air intake apertures 42*a*–42*c* in turn are coupled to pressurized air tubing 38 delivering pressurized air. The pressurized air exhaust apertures 44*a*–44*c* are coupled to pressurized air tubing 30*a*–30*c* leading to respective pumps.

Any tubing sufficient to handle the pressure can be used to conduct the pressured air from the pressurized air source and to the pumps. For example, the pressurized air tubing can be braided tubing coupled via ¼" barbed fittings.

The solenoid valves 40*a*–40*c* are electrically controlled from the dispenser 10. Provision of a signal to a selected solenoid valve (40*b*) causes it to retract and thus open. Pressurized air is thereby permitted to flow through the solenoid valve 40*b* and out pressurized air exhaust aperture 44*b* to the respective pump (i.e., 14*b*). The solenoid vale is retracted for as long as the electrical signal (typically just power) is received.

The valve manifold directs the pressurized air for selective operation of product dispensing pumps. The pressurized air source is preferably set to greater than 45 psi for more viscous juice concentrate. Airflow regulators are known in the art for regulating the flow of pressurized air. Such a regulator can be coupled between a pressurized air source and a valve manifold.

Figure 4:
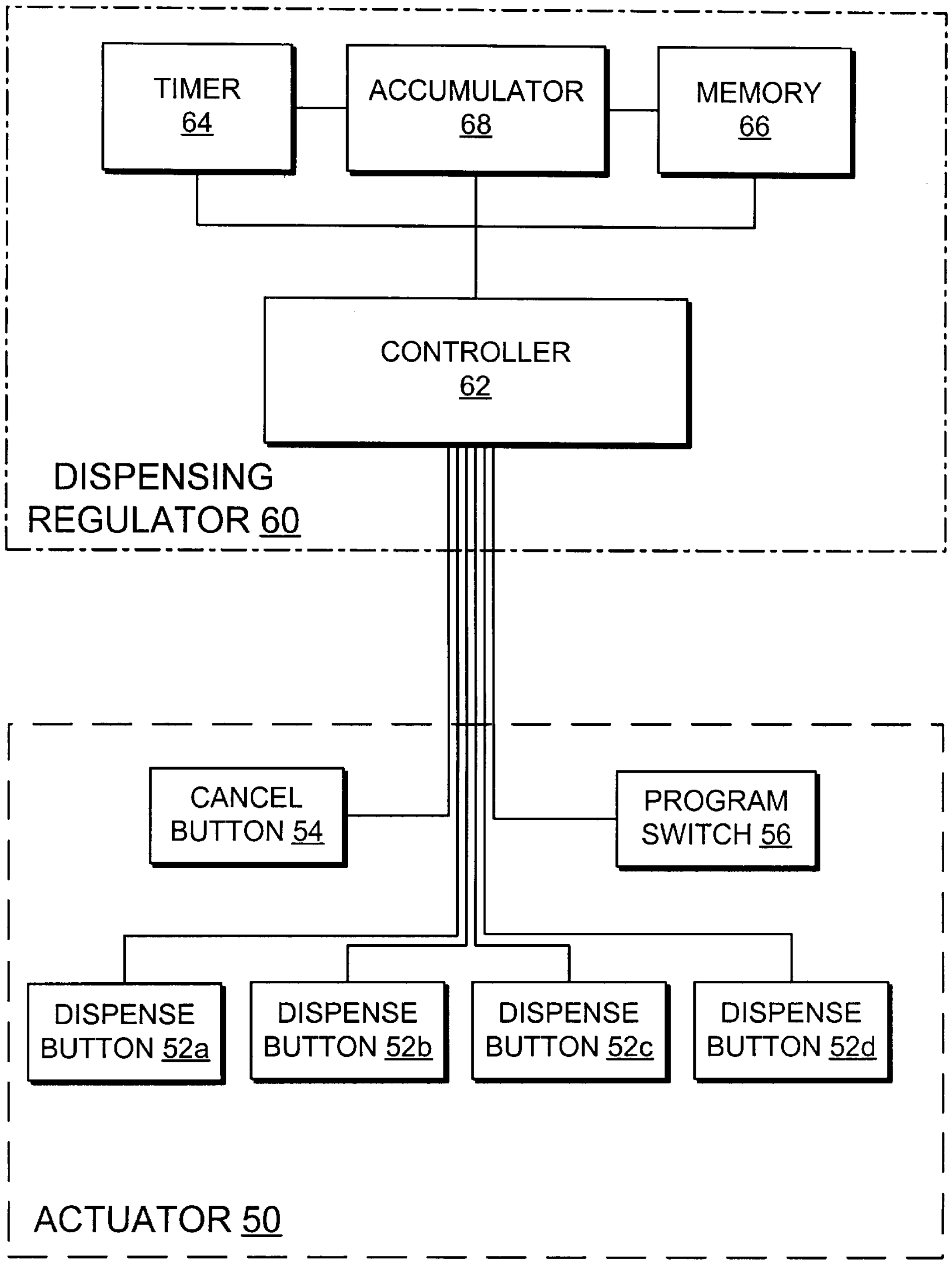
FIG. 4 is a diagram of the dispenser of FIG. 1.

FIG. 4 is a diagram of the dispenser of FIG. 1. The dispenser comprises an actuator and a dispensing regulator.

The dispenser includes electronics that operate the valve manifold responsive to buttons pressed on the dispensing head (not shown). The dispensing regulator can be embodied in a circuit board, which in turn can be mounted to an inside wall of the pump cabinet and protected from accidental contact with the electronic components of the board by a protective metal plate.

The actuator is shown with six buttons: four dispensing buttons 52*a*–52*d*, a program switch/button 56 and a cancel button 54. Each dispensing button is intended to represent a different product of a particular amount. For instance, button 52*a* could activate a sequence whereby approximately seven fluid ounces of orange concentrate is dispensed while pressing button 52*b* results in strawberry concentrate.

The dispensing apparatus can dispense programmed amounts of product from the dispensing heads at the single touch of a button. It is understood that there can be more buttons, for instance another set of four buttons that dispense the same four products but in a different amount (e.g. 4 fluid ounces) than the first four buttons. In this way, one can have buttons that dispense concentrate for small as well as large size drinks. The buttons are coupled via wiring to a circuit board mounted within the pump cabinet of the apparatus.

The dispensing regulator 60 is typically a circuit board having a timer 64, an accumulator 68, memory 66, and a controller 62. The timer circuit and accumulator circuit are active only during a programming sequence, as when the program switch is activated.

The controller 62 is operative to provide an operation mode and a learn mode. In operation mode, the controller can activate a pump solenoid for a predetermined time period in response to actuation of a dispensing button of the fluid media dispenser, thereby causing to be dispensed a desired total volume of fluid.

The controller further includes programming functions for the dispensing buttons 52*a*–52*d*. The controller is operative to program the dispensing button in learn mode.

The timer 64 is operative to measure each of a plurality of dispensing time periods in learn mode. The timer can generally be adapted to be incremented contemporaneous with actuation of a dispensing button.

The accumulator 68 is operative to concatenate each of the plurality of dispensing intervals in learn mode. By accumulating a plurality of dispense times in learn mode, the dispenser can thereby produce a total dispense time to be used in operation mode. The method of programming is detailed below.

As described below, the time over which the signal is sent from the circuit board is determined by an amount stored in memory on the circuit board and determined by programming steps.

A method is presented herein for programming a dispensing button. In an exemplary case under the above program mode example, the button is programmed by dispensing a total of 500 milliliters through four actuations of the button totaling 10.0 seconds.

The timer circuit measures the length of time over which a particular button is manually depressed. The accumulator circuit adds together the amounts of time the button is depressed (totaling 10.0 seconds) while the program switch is activated and then stores this total amount of time into memory when the program switch is deactivated. The accumulator adds an important programming function enabling an operator of the machine to repetitiously or variably depress the button, i.e., dispense a fluid in several increments of varying quantity, until exactly the desired cumulative amount of product is dispensed.

The controller circuit, operating when a button is depressed and the program switch is deactivated (i.e., in operation mode), reads from memory the length of time the button was depressed while in program mode and sends a power signal to a respective one of the solenoids on the valve manifold. The respective solenoid thus retracts for the designated period of time and conducts pressurized air to the respective pump that then drives the selected product to the dispenser head. The cancel button interrupts the controller signal to the solenoids, thereby cutting off the flow of product before the programmed pour is finished.

It is understood that various pour algorithms could be programmed into the controller circuit described above that would allow programming for one button to be applied to another button. For instance, one button can be manually programmed using the timing feature to dispense a small portion of the product and another button can automatically be configured to dispense a large portion of the product, e.g., twice the small portion or some multiple thereof. That is, the large portion button would be programmed to sustain a control signal for the respective solenoid valve for twice as long (or some other multiple) than the small portion button.

The accumulator can apply a correction factor to the total amount of time to correct for mechanical delays in the dispensing system. Conventional dispensing machinery inherently experiences mechanical delays (or "system slack") when a small aliquot of fluid is desired to be dispensed. For example, the dispensing system must first generate sufficient air pressure in the pump and lines to begin dispensing a fluid. A fraction of the time a dispensing button is depressed would be consumed by such action.

However, the multi-aliquot programming above entailed multiple actuations of the button and multiple activations of the pump to dispense product while in learn mode. These multiple depressions of a button multiply the effect of small mechanical delays. Such delays can occur in, for example, activation of a pump solenoid, activation of a pump, or generation of pressure in the product intake and product dispensing tubing. As a result, the total amount of time the button was depressed exceed the total amount of time the pump need actually be active to dispense the desired volume of fluid in one dispense action in the normal (i.e., non-program) mode.

Because the delay intrinsic to a dispensing apparatus can be measured, a correction factor can be programmed into the accumulator circuit. In concatenating the amounts of time the button was depressed, the accumulator can apply a correction factor to adjust for the number of times the button was depressed. In the above example, the accumulator can correct for the system slack contributed by the second through seventh button depressions. After correction, the total amount of time stored in the memory accurately reflects the amount of the time that the pump need be activated to dispense the desired volume of fluid.

Using the above programming example, it can be envisioned that, for any actuation of the dispensing button, 0.2 seconds are spent in activating the pump, generating sufficient negative pressure in the product intake and product dispensing tubing, and moving air through the system. Where the button is programmed by a single aliquot of product in learn mode, this "system slack" is reproducible and does not affect product delivery in operation mode.

In contrast, a plurality of actuations corresponds to a plurality of aliquots dispensed. For example, it is desired to program a button to dispense 500 ml in a system dispensing product at a flow rate of 50 ml per second. The system is placed in the learn mode and 500 ml is dispensed in four aliquots (n=4): a first actuation of 9.2 seconds dispensing 450 ml, a second actuation of 0.7 seconds dispensing 25 ml, a third actuation of 0.5 seconds dispensing 15 ml, and a fourth actuation of 0.4 seconds dispensing 10 ml.

The above multiple-dispense example results in a total volume of 10.0 ml dispensed over a total dispense time of 10.8 seconds. However, each of the four dispense times to be accumulated (i.e., 9.2 sec, 0.7 sec, 0.5 sec, and 0.4 sec) consists of 0.2 sec of system slack, the remainder being actual dispense time. Therefore, in the above example, a total of 0.8 seconds of the 10.8-second total dispense time are "system slack" as described above.

The accumulator can apply a correction factor to reduce the programmed dispense time to compensate for the three (n−1) redundant "system slack" amounts, i.e., the 0.6 seconds contributed by the second, third, and fourth dispense times. The button is then programmed to dispense for a total time of 10.2 seconds when actuated in operating mode.

When actuated, the system will spend 0.2 seconds due to slack and 10.0 seconds will be spent dispensing product at 50 ml/sec. Programming of a button is thereby made simpler for a user, as the proper volume need not be dispensed in a single aliquot, but can instead be fine-tuned to an exact volume. At the same time, errors normally inherent in multi-aliquot programming are corrected in the learn mode.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed:

1. A dispensing regulator for a fluid media dispenser, the regulator comprising: a controller adapted to program a dispensing button of the fluid media dispenser to dispense a desired total volume of fluid; a timer operative to measure each of a plurality of dispensing time periods; a time accumulator operative to concatenate each of the plurality of dispensing intervals; and a memory.

2. The regulator of claim 1, wherein the timer is adapted to be incremented contemporaneous with actuation of a dispensing button of the fluid media dispenser.

3. The regulator of claim 1, wherein the controller is operative to provide an operation mode and a learn mode.

4. The regulator of claim 3, wherein the controller is operative to program the dispensing button in learn mode.

5. The regulator of claim 4, wherein the time accumulator is operative to accumulate a plurality of dispense times in learn mode to produce a total dispense time to be used in operation mode.

6. A method for programming a fluid media dispenser to dispense a desired total volume of fluid corresponding to first-$n^{th}$ dispensed volumes of fluid, the method comprising:

activating a learn mode;

depressing a dispensing button for first-$n^{th}$ intervals to actuate a dispenser pump solenoid and dispense first-$n^{th}$ volumes of fluid;

measuring first-$n^{th}$ time periods corresponding to the first-$n^{th}$ intervals;

accumulating the first-$n^{th}$ time periods to define an accumulated dispense time;

storing the accumulated dispense time in a memory;

associating the accumulated dispense time with the button; and deactivating the learn mode.

7. The method of claim 6, further comprising applying n−1 times a correction factor to the accumulated dispense time prior to storing the accumulated dispense time in a memory.

8. The method of claim 7, wherein the correction factor decreases the accumulated dispense time.

9. The method of claim 7, wherein the correction factor is a time value corresponding to a mechanical delay in the fluid media dispenser.

10. The method of claim 4, wherein the correction factor is a time value corresponding to a delay in actuating the dispenser pump solenoid.

11. The method of claim 6, further comprising depressing the button to dispense the desired total volume of fluid from the dispenser.

12. An article comprising a storage medium, said storage medium having stored thereon instructions that, when executed by a computing device, result in:

activating a learn mode;

depressing a dispensing button for first-$n^{th}$ intervals to actuate a dispenser pump solenoid and dispense first-$n^{th}$ volumes of fluid;

measuring first-$n^{th}$ time periods corresponding to the first-$n^{th}$ intervals;

accumulating the first-$n^{th}$ time periods to define an accumulated dispense time;

storing the accumulated dispense time in a memory;

associating the accumulated dispense time with the button; and deactivating the learn mode.

13. The article of claim 12, further comprising applying n−1 times a correction factor to the accumulated dispense time prior to storing the accumulated dispense time in a memory.

14. The article of claim 13, wherein the correction factor decreases the accumulated dispense time.

15. The article of claim 13, wherein the correction factor is a time value corresponding to a mechanical delay in the fluid media dispenser.

16. The article of claim 12, wherein the correction factor is a time value corresponding to a delay in actuating the dispenser pump solenoid.

17. The article of claim 12, further comprising depressing the button to dispense the desired total volume of fluid from the dispenser.

* * * * *